United States Patent
Kotzin et al.

[11] Patent Number: 5,363,404
[45] Date of Patent: Nov. 8, 1994

[54] APPARATUS AND METHOD FOR CONVEYING INFORMATION IN A COMMUNICATION NETWORK

[75] Inventors: Michael D. Kotzin, Buffalo Grove; Eugene J. Bruckert, Arlington Heights, both of Ill.

[73] Assignee: Motorola Inc., Schaumburg, Ill.

[21] Appl. No.: 91,147

[22] Filed: Jul. 13, 1993

[51] Int. Cl.⁵ .............................................. H04K 1/10
[52] U.S. Cl. ............................... 375/1; 380/34; 455/56.1; 455/54.1; 379/61; 379/63
[58] Field of Search ............... 375/1; 455/56.1, 54.1; 380/34; 379/61, 63

[56] References Cited

U.S. PATENT DOCUMENTS

| | | |
|---|---|---|
| 5,239,557 | 8/1993 | Dent .................................. 375/1 |
| 5,283,806 | 2/1994 | Dartois et al. ..................... 375/1 |
| 5,295,153 | 3/1994 | Gudmundson ..................... 375/1 |
| 5,301,205 | 4/1994 | Tsutsui et al. ..................... 375/1 |

FOREIGN PATENT DOCUMENTS

0522772A2 6/1992 European Pat. Off. .
0522773A2 6/1992 European Pat. Off. .

*Primary Examiner*—David C. Cain
*Attorney, Agent, or Firm*—Richard A. Sonnentag

[57] ABSTRACT

A direct sequence code-division multiple access (DS CDMA) communication system schedules conveyance of blocks (400) of information such that the blocks arrive at a base-site (130) just-in-time for transmission during a discrete frame (301-305) of an air-interface. The DS CDMA communication system implements both circuit switching and packet switching approaches to provide trunking efficiencies while balancing between system loading constraints and time delay of blocks (400) during conveyance.

23 Claims, 3 Drawing Sheets

5,363,404

1

APPARATUS AND METHOD FOR CONVEYING INFORMATION IN A COMMUNICATION NETWORK

FIELD OF THE INVENTION

The invention relates generally to communication networks and more specifically to conveying information in communication networks.

BACKGROUND OF THE INVENTION

A cellular radiotelephone network generally comprises a plurality of mobile stations in radio communication with a plurality of base-sites, coupled to a base-site controller, and a plurality of base site controllers coupled to a mobile switching center. There may be a plurality of mobile switching centers. The coupling means is generally via bi-directional microwave or wireline terrestrial-based circuits such as T1 ISDN links. Many channels of individual subscriber information are generally communicated over each of these links.

While the links generally employ a serial digital physical connection, logical circuits are created to carry individual channels of subscriber information. There are two traditional techniques utilized to create the logical medium partitioning—circuit and packet switching.

Circuit switching is the traditional technique utilized. In a circuit switching arrangement, each logical circuit is allocated a constant portion of the total bandwidth of the circuit. The multiplexing technique is typically time division multiple access (TDMA). The serial digital stream is multiplexed to allocate each circuit a certain number of bits per second in a predetermined way. Control bits are inserted to facilitate the proper transport of the serial physical stream.

A typical T1 circuit provides approximately 1.544 megabit/s of serial binary information. A typical logical partitioning is into 24 individual PCM circuits of 64 kilobits per second each. Physically, eight bits from each circuit is, in turn, sent sequentially. Alternatively, the T1 circuit may be logically partitioned into 48 individual ADPCM circuits of 32 kilobit/s each. Physically, four bits from each ADPCM circuit is, in turn, sent sequentially.

An alternate technique to circuit switching is packet switching. In packet switching, information from each of the individual sources is buffered by a packet controller. In a predetermined way, information is transmitted in blocks using the full bandwidth of the circuit. Information blocks are encoded along with certain control and addressing information, allowing a packet controller receiving the packet the capability to properly reconstruct the individual logical channel's information.

The above techniques are traditionally utilized in digital cellular radiotelephone communication networks. Such networks have air interfaces which multiplex information from several users onto a single radio frequency (RF) resource (i.e., a channel). For example, in a time division multiplexed (TDM) system, information from several users share a common RF channel, but are transmitted in bursts, where information from each user is sequenced in time. An alternative implementation utilizes direct sequence code division multiple access (DS CDMA). In this case, all users share at the same time an RF channel and each user's data stream is distinguished by encoding it with a unique code. Use of this code at the receiver allows discrimination of one user from another.

2

All the above networks are slotted or framed. In such networks, information from a user is sent in blocks. For example, speech is coded in sampled blocks, generally consisting of about 20 msec of information. This information is coded into a block of information that is transmitted over an air interface. At the receiver, the blocks are decoded to create an adequate representation of the original analog sample waveform.

Delay is a common problem for all varieties of networks. It is desirable to minimize the introduced time delays since excess delay reduces perceived quality and burdens the ability of echo cancellation circuits to eliminate the effects. Therefore, cellular radiotelephone communication networks incorporating circuit switching incorporate provisions to adjust the timing of an interface means so that information is received just at the moment it is needed for transmission over the air interface. Traditional packet switching of individual circuits is not amenable to traditional delay control and minimization procedures.

A problem with circuit switching is that it generally takes 20 ms to send the sampled block of speech. That is, each 20 ms block of information is bit-by-bit time-division multiplexed onto the individual PCM circuit or broken into small sub blocks which in turn are time-division multiplexed onto the individual PCM circuit. The receive end must buffer the received bits until the entire 20 ms block is received and only then may further processing commence.

A problem arises in organizing the switching resource when the bandwidth of an individual logical circuit is not fixed. Such is the case, for example with the DS CDMA air interface specification recently standardized by the Telecommunications Industry Association (TIA) as document IS 95. This interface utilizes a variable rate speech vocoding system, standardized as TIA document IS 96, which encodes 20 msec blocks of speech at rates of 8, 4, 2 or 1 kilobit/s. The speech is determined to minimize the average rate but ensure that adequate speech quality is provided. Furthermore, timing of each logical circuit's transmitted blocks may be staggered with respect to each other. In this DS CDMA implementation, a circuit switching approach allows for trunking efficiencies when communicating information for individual users. A packet switching approach must also allow for trunking efficiencies when communicating information for individual users.

Thus a need exists for a cellular radiotelephone network having the benefits of both circuit and packet switched interface techniques while mitigating time delay introduced by these interface techniques.

DETAILED DESCRIPTION OF A PREFERRED EMBODIMENT

In a cellular radiotelephone network, frame timing is implemented by an interface means related to the discrete frame offset timing produced by a base-site at an air interface such that information transferred by the interface means is substantially aligned with information to be conveyed by the base-site. Such alignment minimizes circuit complexities required in processors at the interface means, which in turn controls the likelihood of information being lost between the various elements of the network.

Figure 1:
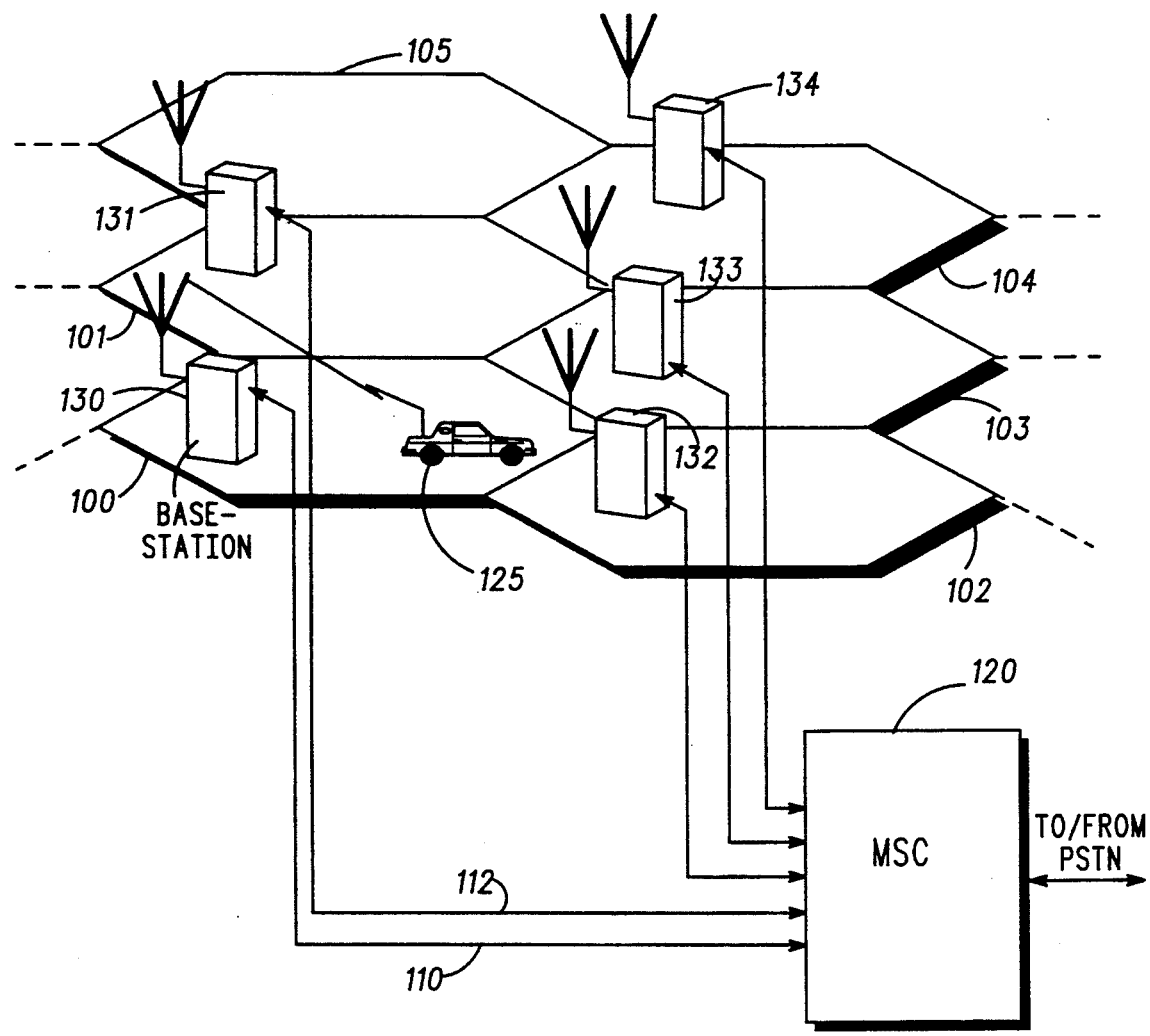
FIG. 1 generally depicts a communication network which may beneficially employ the present invention.

FIG. 1 generally depicts a communication network which may beneficially employ the present invention. In the preferred embodiment, the communications network is a code division multiple access (CDMA) cellular radiotelephone network having base-stations 130–134 coupled to an Mobile Switching Center (MSC) 120. MSC 120 serves as an interface means between a local public switched telephone network (PSTN) and base-stations 130–134 of the CDMA network. As shown in FIG. 1, a mobile station 125 communicates with a serving base-station, which is illustrated in FIG. 1 as base-station 130. While this invention has utility for both directions of communications between the MSC and the base-stations, only the downlink direction, from MSC to base-station, is described.

Figure 2:
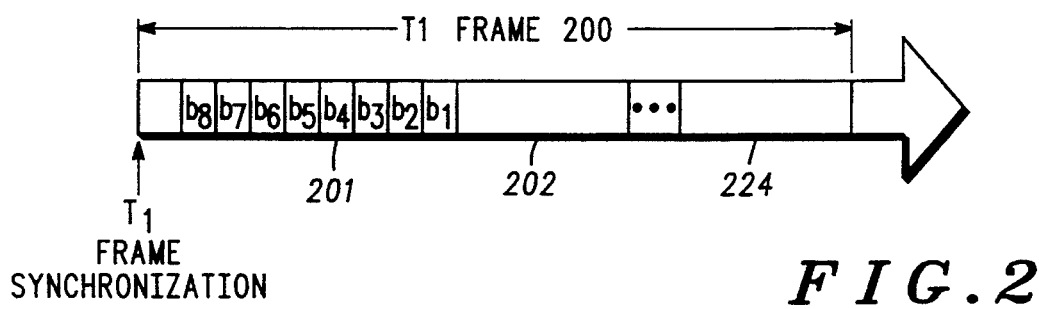
FIG. 2 generally depicts the framing format of a T1 link utilized to convey information from an MSC to base-stations.

Information to base-station 130 intended for mobile station 125 is conveyed via link 110, which in the preferred embodiment is a T1 link. In the preferred embodiment, the information may be either voice (speech) or data information. FIG. 2 generally depicts the framing format of a T1 link 110 utilized to convey information from MSC 120 to base-stations 130–134. As depicted in FIG. 2, each T1 frame 200, which represents frame timing of T1 link 110, comprises one T1 frame synchronization bit 230 and a subsequent 192 bits of data. Traditionally, 24 message channels 201–224 are sent sequentially in each T1 frame. Each message channel represents data for one "conversation" and comprises 8 bits b1–b8 where b1 is the least significant bit and b8 is the most significant bit. The bit rate per message channel is 64 Kbit/s. The T1 frame rate is 8000 frames per second.

Figure 3:
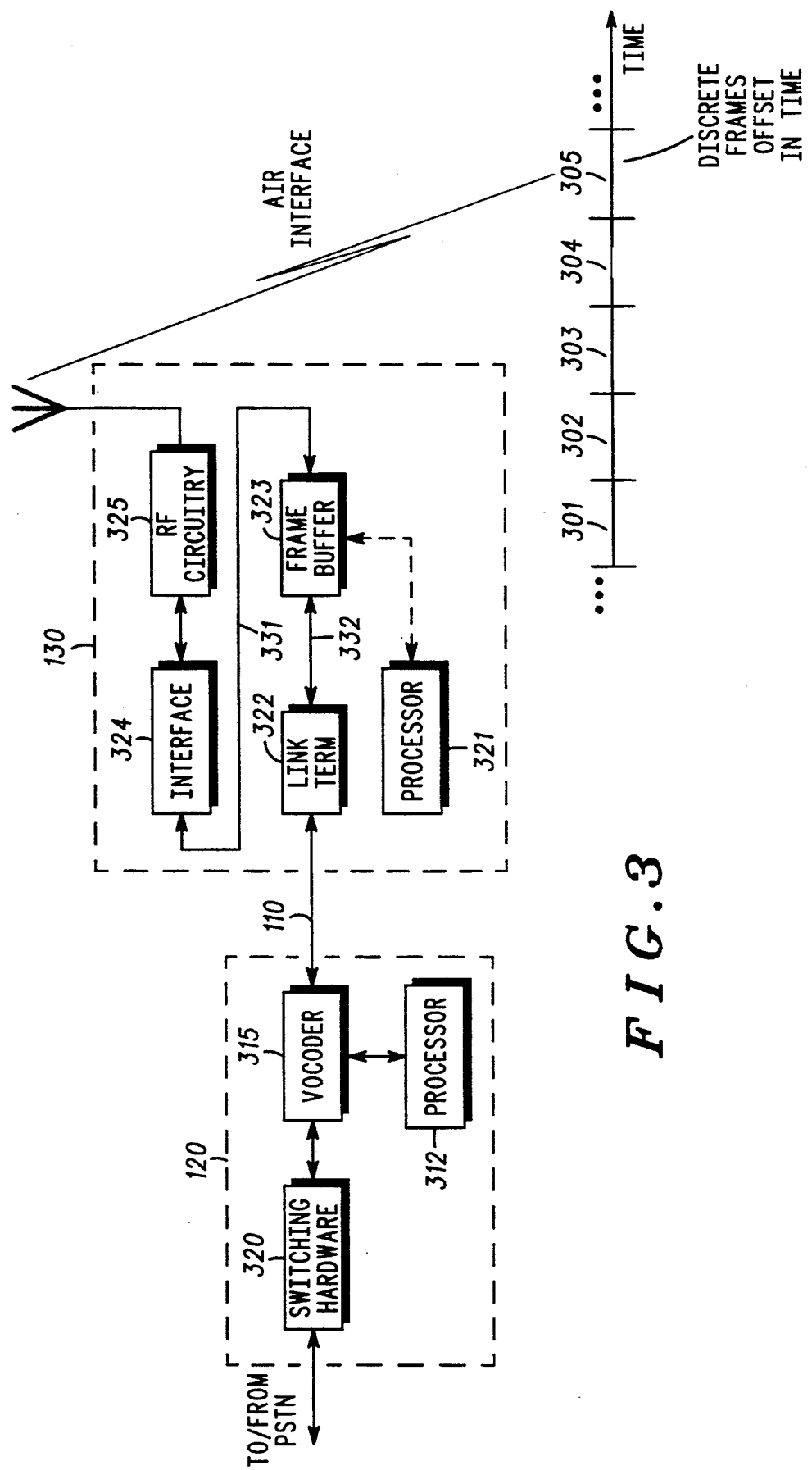
FIG. 3 generally illustrates a CDMA network conveying information via an air interface having discrete frame offset timing.

FIG. 3 generally illustrates a CDMA network conveying information via an air interface having framed downlink communications at a rate of 20 msec per frame. In the preferred embodiment, the MSC 120 contains, inter alia, a vocoder 315, switching hardware 320 coupled to the PSTN, and a processor 312. In future cellular radiotelephone network embodiments, the vocoder 315 may be physically separate from the MSC 120. Continuing, the vocoder 315 is used to compress voice data from the PSTN, via switching hardware 320, into packets of compressed voice data which can be transferred over T1 link 110. Vocoder 315 has the unique capability of coding speech at variable rates, where the instantaneous rate is dependent on the number of bits the vocoder determines are required to achieve a desired quality level. Therefore, the packets of compressed voice data are of variable length.

Figure 5:
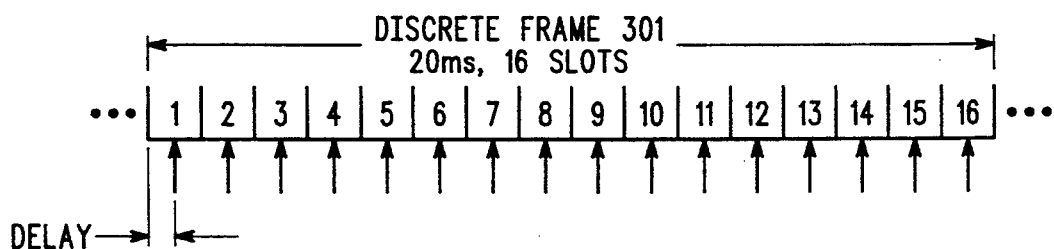
FIG. 5 generally depicts staggering of discrete frames on a 1.25 msec (out of 20 msec) basis producing 16 distinct time offsets for frame start.

The CDMA air interface provides means such that the frame boundaries for the discrete frames for different users may be offset relative to one another. As depicted in FIG. 5, each discrete frame 301–305 (only discrete frame 301 is shown for purposes of simplicity) is staggered (or offset in time) on a 1.25 msec (out of 20 msec) basis producing 16 distinct time offsets for frame start. Important to note is that all mobile stations have a common reference time, delayed only by a transmission time from a base-station to a mobile station. In the preferred embodiment, each discrete frame 301–305 contains coded vocoder information that describes 20 msec of speech, and is itself 20 milliseconds (msec) in length.

In CDMA networks, use of traditional circuit switching in switching hardware 320 increases the bulk delay of information significantly. This delay may be reduced by implementing a packet switch in switching hardware 320, but full implementation of a packet switch is complex and not consistent with typical architecture of a CDMA network. To reduce the delay without greatly altering the architecture and maintaining compatibility with the current platform, a time-slotted T1 (with possibly some reserved bandwidth for circuit switched or control use) for use in the CDMA network is utilized in accordance with the invention. Basically, T1 link 110 is synchronized to the discrete frames of the CDMA air interface which, as mentioned previously, may be staggered (or offset in time) on a 1.25 msec (out of 20 msec) basis as depicted in FIG. 5. Consequently, instead of allocating continuous message channels, the full bandwidth of T1 link 110 is restructured to provide, inter alia, the stated synchronization. Thus, a full 20 msec worth of information no longer takes 20 msec to transmit (as with a conventional circuit switched message channel) but only 1.25 msec. In this manner, introduced delay is substantially reduced.

Figure 4:
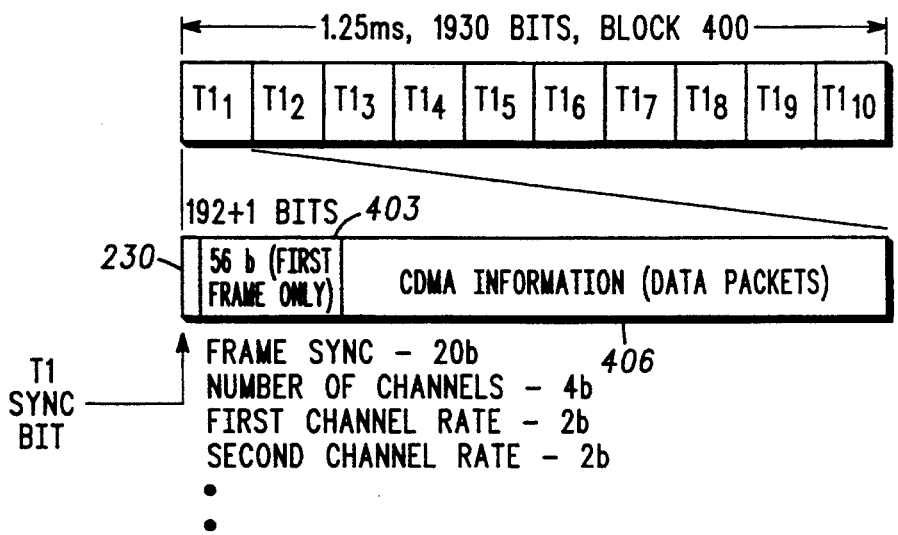
FIG. 4 generally depicts data packet multiplexing onto a T1 link in accordance with the invention.

FIG. 4 generally depicts a restructured T1 link 110 in accordance with the invention. FIG. 4 depicts a 193 bit T1 frame (T1 frame 200 of FIG. 2) which begins with a 1-bit T1 frame synchronization field and which traditionally would have been followed by 24 8-bit fields representing 24 channels of 64 Kbit/s pulse code modulation (PCM) data. Instead of transferring individualized T1 frames in the PCM format, however, T1 link 110 is restructured by grouping T1 frames into a block 400 of N T1 frames and appending a header 403 to every Nth frame. In the preferred embodiment, the T1 frames are grouped into a block 400 of 10 T1 frames, and a 54-bit header 403 is appended to every 10th frame. Following header 403 is CDMA information 406 in the form of data packets. Important to note is that CDMA information 406 bridges over the T1 frame synchronization bit 230 for each T1 frame T2–T10.

Header 403 consists of a 20-bit synchronization field, a 4-bit #_of_CDMA_ frames field and up to 16 CDMA frame length fields. The full rate frames of IS 95 have 184 information/CRC bits, thus spacing for only 10 CDMA frames is guaranteed. Even when the #_of_CDMA_ frames field is selected to be 16, to have a predetermined number of vocoders, for example 10 or more vocoders transmitting frames at a given (full) rate out of 16 total, is quite rare. In this scenario, provision can be made at processor 312 to prevent a vocoder, for example vocoder 315, from transmitting full rate when there is likelihood of overflow of the link such as if there are 9 other vocoders transmitting full rate. In this manner, blocking over T1 link 110 is substantially mitigated. Alternatively, the #_of_CDMA_ frames field may be prohibited from exceeding 10, thus guaranteeing that blocking on T1 link 110 will not occur.

It is desired that a block 400 (i.e., a packet) transmitted by vocoder 315 arrive at base-site 130 in a compressed voice format at a particular time with respect to discrete frames 301–305. To accomplish this, block 400 is scheduled to arrive at the base-site just-in-time for it to be transmitted during its assigned offset frame in accordance with the invention. This is performed by MSC 120 first measuring the transmission delays between vocoder 315 and base-site 130 to which it is coupled and also measuring a signal processing time associated with base-site 130. MSC 120 then adjusts the timing of vocoder 315 to account for the measured delays as well as the particular frame offset assigned to the individual circuit. In this manner, just-in-time scheduling of block 400 for transmission during a particular discrete frame 301–305 is accomplished.

Scheduling in the above manner can also be utilized to level the load amongst assigned offsets of the discrete frames for the air-interface. This ensures that associated blocks 400, each corresponding to one or more offsets of the air-interface, are not overloaded when mobile station 125 is handed off to another cell.

Figure 6:
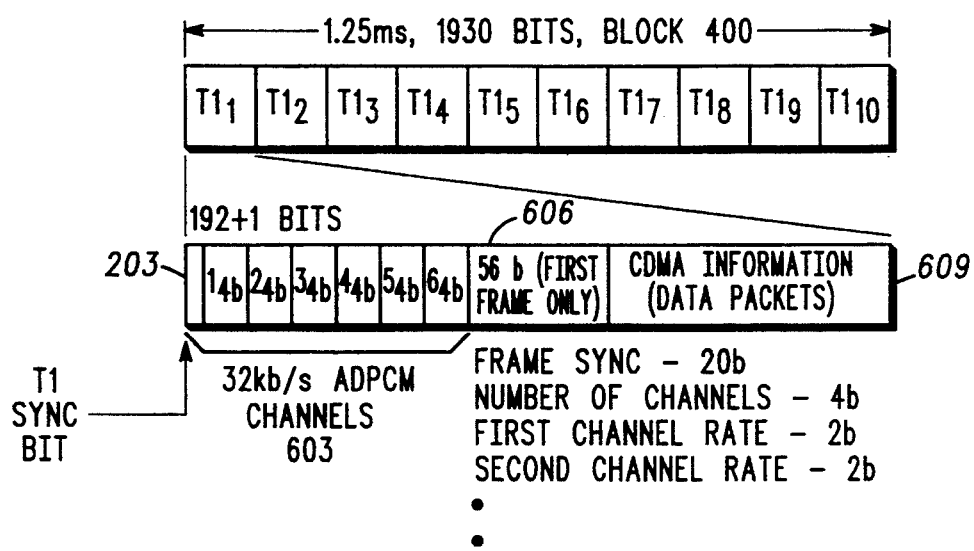
FIG. 6 generally depicts an alternate embodiment of data packet multiplexing onto a T1 link in accordance with the invention.

It is recognized that many different T1 restructurings are possible which provide the packet blocks in alternate configurations. For example, it is recognized that there may be a need for PCM channels and various control or data channels which are preferably communicated in a circuit switched format. FIG. 6 generally depicts an alternate embodiment of data packet multiplexing onto a T1 link in accordance with the invention. FIG. 6 depicts a T1 restructuring which includes 3 circuit switched 32 Kbit/s message channels 606, and is but one of many possible T1 restructurings that may be performed based on system requirements.

As stated above, a circuit switching approach allows for trunking efficiencies in a DS CDMA communication system. One such approach is described in the instant assignee's pending U.S. application Ser. No. 997,997 filed on Dec. 28, 1992, entitled "*Method and Apparatus for Transferring Data in a Communication System,*" invented by Michael J. Bach and William R. Bayer, and incorporated herein by reference. Due to, certain characteristics of the DS CDMA communication system (for example, inter alia, loading characteristics), the approach described in Bach may at times be preferable (based on efficiency, for example) to the invention described herein. Consequently, provision may be made in processor 312, vocoder 315 and link termination 322 to convert T1 link 110, at an appropriate time, from the packet switching arrangement described herein in accordance with the invention to the circuit switched T1 approach of Bach, and vice versa. Conversion may take place one individual circuit at a time. In its optimum configuration to balance between system loading and time delay minimization in the DS CDMA communication system, the DS CDMA communication system may employ a time-shared combination of circuit/packet switching by providing appropriate provisions in processor 312, vocoder 315 and link termination 322.

While the invention has been particularly shown and described with reference to a particular embodiment and an alternate embodiment, it will be understood by those skilled in the art that various changes in form and details may be made therein without departing from the spirit and scope of the invention.

What we claim is:

1. A communication network comprising:
    a base-site for conveying information via an air interface having discrete frame offset timing; and
    an interface means, coupled to the base-site, for implementing frame timing related to the discrete frame offset timing of the air interface.

2. The communication network of claim 1 wherein said information is deterministically associated with a particular framing timing of the interface means.

3. A communication network comprising:
    a base-site for conveying blocks of information via an air interface having discrete frame offset timing; and
    means, coupled to the base-site, for determining which blocks are to be conveyed during which discrete frames and transferring the blocks of information to the base-site in frame timing related to the determination.

4. The communication network of claim 3 wherein the blocks of information further comprise blocks of 10 T1 frames.

5. The communication network of claim 4 wherein the block of 10 T1 frames each have a header appended thereon every 10th frame.

6. A communication network comprising:
    a plurality of base-sites for synchronously conveying blocks of information via an air interface having discrete frame offset timing; and
    means, coupled to the base-sites, for determining which blocks are to be conveyed during which discrete frames and transferring the blocks of information to the plurality of base-sites in frame timing related to the determination.

7. The communication network of claim 6 wherein the blocks of information further comprise blocks of 10 T1 frames.

8. The communication network of claim 7 wherein the blocks of 10 T1 frames each have a header appended thereon every 10th frame.

9. The communication network of claim 6 wherein the plurality of base-sites further comprise a plurality of code division multiple access (CDMA) base-sites.

10. An interface in a communication network comprising:
    means for grouping frames of information into blocks of information;
    means for determining when, in time, the blocks of information are to be transmitted over an air interface by a base-site; and
    means for sequentially transferring the blocks of information to the base-site in an order based on the determination.

11. A method of mitigating blocking on a communication link, the communication link coupling an interface means and a base-site, the method comprising the steps of:
    determining, based on a predetermined number of vocoders transmitting at a given rate, the likelihood of overflow on the link; and
    preventing a vocoder, out of the predetermined number of vocoders, from transmitting at the given rate.

12. An apparatus for mitigating blocking on a communication link, the communication link coupling an interface means and a base-site, the apparatus comprising:
    means for determining, based on a predetermined number of vocoders transmitting at a given rate, the likelihood of overflow on the link; and means, at a vocoder out of the predetermined number of vocoders, for transmitting at a rate different than the given rate based on the determined likelihood.

13. The apparatus of claim 12 wherein the given rate further comprises full rate.

14. The apparatus of claim 13 wherein the predetermined number of vocoders transmitting at a given rate further comprises at least 9 vocoders transmitting at full rate.

15. The apparatus of claim 12 wherein the communication link further comprises a T1 link.

16. A method scheduling blocks of information produced by a vocoder at an interface means for transmission by a base-site during discrete frames of an air-interface, the method comprising the steps of:

measuring a delay between a vocoder at the interface means and the base-site and a signal processing time associated with the base-site; and adjusting a timing of the vocoder to account for the measured delays whereby the blocks of information arrive at the base-site just-in-time for transmission during a corresponding discrete frame.

17. An apparatus for scheduling transmission of blocks of information, the blocks of information produced by a vocoder at an interface means, the blocks of information to be transmitted by a base-site during discrete frames of an air-interface, the apparatus comprising:

means for measuring a delay between a vocoder at the interface means and the base-site and a signal processing time associated with the base-site; and means, at the vocoder, for adjusting timing of the vocoder to account for the measured delays whereby the blocks of information arrive at the base-site just-in-time for transmission during a corresponding discrete frame of the air-interface.

18. The apparatus of claim 17 wherein the scheduling is further utilized to level the load amongst assigned offsets of the corresponding discrete frame of the air-interface.

19. A method of conveying information from an interface means to a base-site in a communication system, the method comprising the steps of:

determining, based on certain characteristics of the communication system, which of a packet switched or circuit switched approach is preferable for information conveyance; and switching to a packet switched or circuit switched approach based on the determined characteristics of the system.

20. An apparatus for conveying information from an interface means to a base-site in a communication system, the apparatus comprising:

means for determining, based on certain characteristics of the communication system, which of a packet switched or circuit switched approach is preferable for information conveyance; and means for switching to a packet switched or circuit switched approach based on the determined characteristics of the system.

21. The apparatus of claim 20 wherein the communication system further comprises a direct sequence code-division multiple access (DS CDMA) communication system.

22. The apparatus of claim 21 wherein the certain characteristics further comprise loading characteristics of the DS CDMA communication system.

23. The apparatus of claim 22 wherein said means for switching further comprises means for employing time-shared switching between a combination of circuit switching and packet switching to balance between the loading characteristics of the DS CDMA communication system and time delay minimization in the DS CDMA communication system.

* * * * *